United States Patent Office 2,789,532
Patented Apr. 23, 1957

2,789,532

WIND ORIENTED CATTLE FEEDER

Ancel Z. Hoebing, Okarche, Okla.

Application April 11, 1955, Serial No. 500,559

2 Claims. (Cl. 119—51)

The present invention relates to feed dispensers, and more particularly to a device for providing a mineral supplement feed dispenser for cattle, or the like, in an open pasture.

The principal object of this invention is to provide a feeder which is comparatively light in weight and may be manually moved easily from one location to another.

An additional object of this invention is to provide a feeder for cattle, or the like, which has a vane for rotating the feed receptacle opening leewardly and thus preventing moisture entering the opening during storms, or the wasting of feed or minerals from said receptacle by the wind.

Another object of this invention is to provide a cattle feeder adapted for using junk automobile parts or scraps, or the like, for the base support and thus permitting its manufacturing and installation at comparatively low cost.

Another object of this invention is to provide a shielded rotating supporting means of such construction that the bearings thereof will be protected from dust and the like, and thus be prevented from becoming clogged, and thereby allowing the receptacle to turn freely with wind directional changes.

A further object of this invention is to provide a feeder of sturdy construction which will not become damaged and rendered inoperative by livestock while the feeder is in use.

The present invention accomplishes these and other objects by providing a vertically disposed post axially connected to a supporting wheel and having a spindle top end portion, about which is rotatably mounted a hub containing suitable bearings; the hub has a rigid horizontally disposed flange, to the upper surface of which is rigidly connected a cradle; the cradle rigidly supports a receptacle having a vertically disposed opening in one side; a vane connected to the receptacle acts to rotate the receptacle to position, the opening leewardly thus preventing atmospheric precipitation from entering the receptacle, and saving loss of usable contents of the device.

Figure 1:
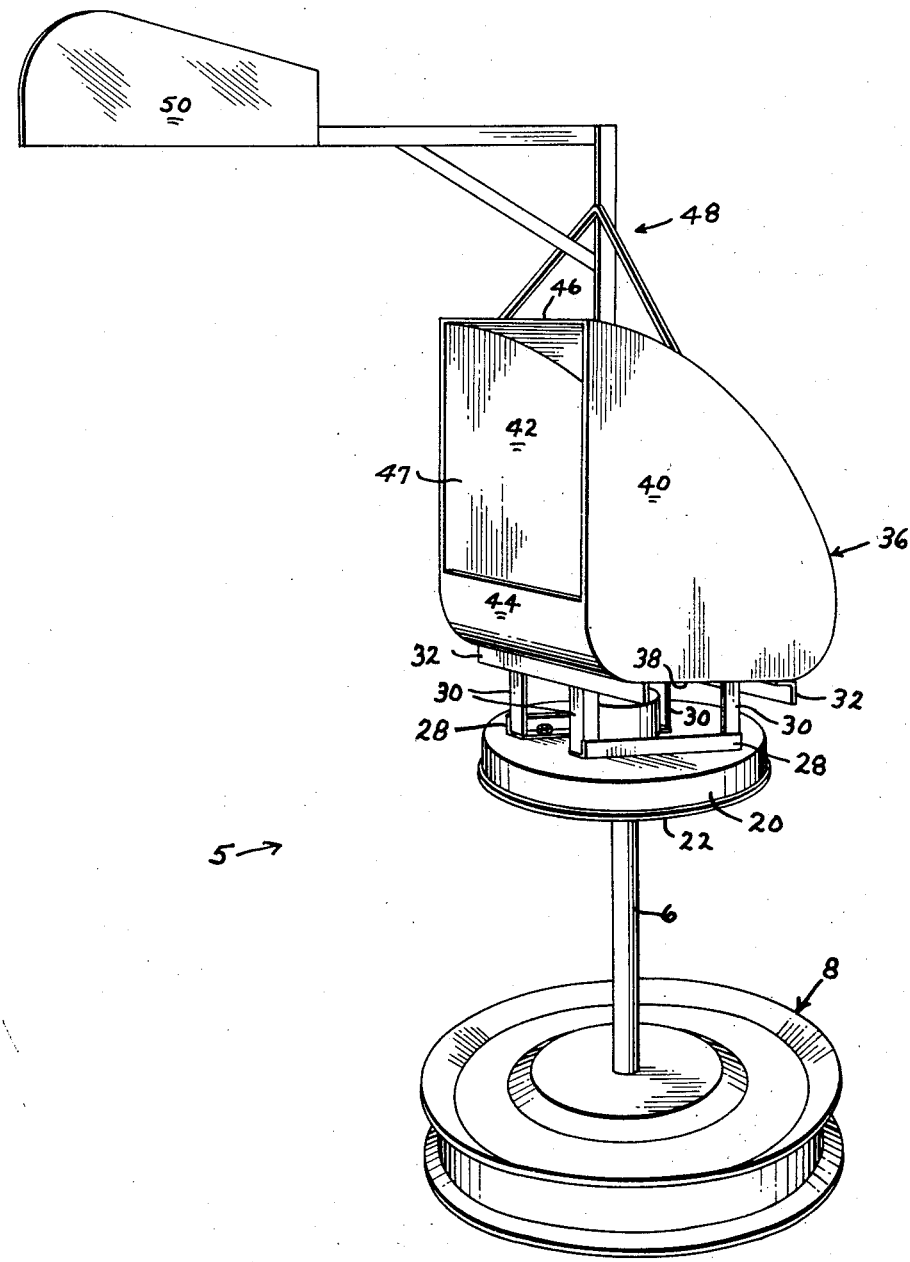
Figure 2:
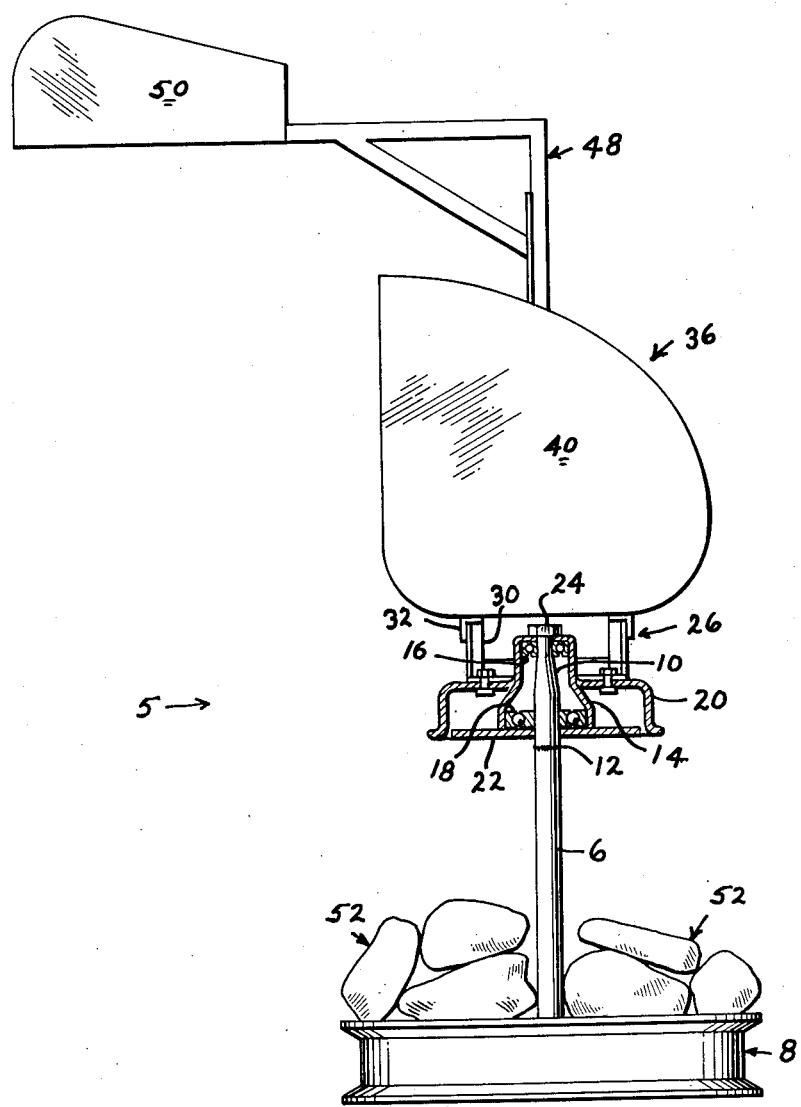

Other objects will be apparent from the following description when taken in conjunction with the accompanying two sheets of drawings, wherein:

Figure 1 is a perspective view of the device; and
Figure 2 is an elevational view of the device partly in section.

Like characters of reference designate like parts in those figures of the drawings in which they occur.

In the drawings:

The reference numeral 5 indicates the device, as a whole, preferably of metallic construction. A post or pedestal 6 of a selected length, which may be a discarded automobile axle, is rigidly connected axially to a circular base member or wheel 8, such as an old automobile wheel. The post 6 has a tapered or spindle shaped upper end portion 10. This spindle portion 10, such as the front wheel spindle of an automobile, may be welded to any suitable metallic post, as at 12, if axles are not available. The purpose of the base or wheel is to vertically support the post 6 and prevent livestock from upsetting the device by rubbing against the same. The upper surface of the base is preferably recessed for receiving base weights, as more fully described hereinbelow. Other old automotive parts used are, a front wheel hub 14 having an upper bearing 16 and a lower bearing 18 contacting the spindle 10 to rotatably support the hub 14. A flange or brake drum 20 is rigidly connected to the hub 10 intermediate its ends. The depending edge of the flange 20 is closed by a flange plate 22 rigidly connected to the spindle 10 which keeps dust out of the bearings. A nut 24 holds the hub 10 on the spindle.

An angle iron cradle 26 comprising base members 28 rigidly connected in parallel relation by suitable rivets or bolts to the upper surface of the flange 20 on opposing sides of the hub 10 and short upstanding legs 30 rigidly connected at one end to each end, respectively, of the base members 28. The legs 30 are rigidly connected at their upper ends to a pair of horizontal spaced-apart parallel supports 32 in right angular relation with respect to the base members 28.

A feed receptacle 36 having a substantially square bottom 38, vertical parallel ends 40 and 42, a front side wall 44 integral with the bottom 38 and arcuately curved upwardly therefrom a comparatively short distance, and a back side 46 integral with the bottom 38 and arcuately curved upwardly and forwardly forming a back side and top, ending in vertical spaced-apart parallel relation with the upper edge of the front wall 44 defining with the sides 40 and 42 a vertically disposed lateral opening 47. The bottom 38 of the receptacle is flatly connected to the upper surface of the supports 32. The edges of the ends 40 and 42 are arcuately curved to meet the respective edges of the front and back sides 44 and 46 and are rigidly connected therewith, as by welding. Suitable strap iron bracing 48 rigidly connected to the surface 46 supports a vane 50 which projects laterally of the receptacle above the opening 47.

*Operation*

The operation of the device seems obvious from the above description. The device 5 filled with feed or mineral supplement is placed at a selected location in a pasture. Rocks or broken chunks of concrete 52 may be placed upon the wheel 8 to insure the maintenance of the device in an upright position. The device is easily moved manually from one location or pasture to another which is a desirable feature.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A livestock feeder, including: a horizontally disposed circular base having a recess in its upper surface for removably receiving base weights; a vertical support post axially connected at one end to said circular base, said post having a spindle top end portion; a bearing equipped hub rotatably carried by the spindle portion of said post; a horizontally disposed flange rigidly connected to said hub intermediate its ends, said flange having a depending edge; a flange plate rigidly connected axially to said post adjacent the depending edge of said flange for closing the lower end of said hub; an angle iron cradle carried by said flange, said cradle comprising a pair of parallel base members rigidly connected in spaced horizontal relation to the upper surface of said flange, four vertically disposed legs rigidly connected at their lower ends to the respective ends of said base members, and a pair of parallel supports rigidly connected intermediate their ends to the upper ends of each pair of legs carried by the respective ends of said base members; a receptacle carried by the supports of said cradle, said receptacle comprising, vertical end walls connected to a horizontal bottom, a short arcuate front side wall integral with said bottom, and an arcuate rear side wall integral with said bottom and extending upwardly and forwardly from said bottom ending in parallel spaced relation above said front wall to define, with said ends, a lateral vertically disposed opening; a vane rigidly connected to the upper surface of said receptacle and projecting laterally thereabove for rotating said receptacle and positioning said opening leewardly; and base weights removably carried by the recess of said circular base.

2. A livestock feeder, including: a horizontally disposed circular base having a recessed upper surface for removably receiving base weights therein; a vertical support post axially connected at one end to said circular base, said post having a spindle top end portion; a bearing equipped hub rotatably carried by the spindle portion of said post; a horizontally disposed circular flange rigidly connected to said hub intermediate its ends, said flange having a depending edge; a flange plate rigidly connected axially to said post adjacent the depending edge of said flange for closing the lower end of said hub; a nut threadedly engaged with the top of said spindle for retaining said hub thereon; an angle iron cradle carried by the upper surface of said flange, said cradle comprising a pair of parallel base members rigidly connected in spaced horizontal relation to the upper surface of said flange on opposing sides of said hub, four vertically disposed comparatively short legs rigidly connected at their lower ends to the respective ends of said base members, and a pair of parallel supports rigidly connected intermediate their ends to the upper ends of each pair of legs carried by the respective ends of said base members and in right angular relation thereto; a receptacle comprising, vertical end walls connected to a horizontal bottom, a short arcuate front side wall integral with said bottom, and an arcuate rear side wall integral with said bottom and extending upwardly and forwardly from said bottom ending in fixed parallel spaced relation above said front wall to define, with said ends, a lateral vertically disposed opening; a vane rigidly connected to the upper surface of said receptacle and projecting laterally thereabove over said opening for rotating said receptacle and positioning said opening leewardly; and base weights removably carried by the recess of said circular base.

References Cited in the file of this patent
UNITED STATES PATENTS

| | | |
|---|---|---|
| 2,656,819 | Meier | Oct. 27, 1953 |
| 2,682,255 | Kleeman | June 29, 1954 |
| 2,691,958 | Lage | Oct. 19, 1954 |